United States Patent
Fujiwara

[19]

[11] Patent Number: 5,418,402
[45] Date of Patent: May 23, 1995

[54] POWER SUPPLY VOLTAGE CHANGE-OVER APPARATUS FOR A VEHICLE

[75] Inventor: Toru Fujiwara, Himeji, Japan

[73] Assignee: Mitsubishi Denki Kabushiki Kaisha, Tokyo, Japan

[21] Appl. No.: 64,882

[22] Filed: May 24, 1993

[30] Foreign Application Priority Data

Jun. 4, 1992 [JP]  Japan .................. 4-143898

[51] Int. Cl.$^6$ .................................. H02J 7/00
[52] U.S. Cl. ........................ 307/10.1; 320/6; 307/66; 307/71
[58] Field of Search ............... 307/71, 85, 66, 65, 307/64, 149, 150, 37; 320/6, 7, 16; 340/644

[56] References Cited

U.S. PATENT DOCUMENTS

| | | | |
|---|---|---|---|
| 4,375,593 | 3/1983 | Winterbotham | 307/37 |
| 4,694,237 | 9/1987 | Hanson | 320/6 |
| 5,121,046 | 6/1992 | McCullough | 320/16 |
| 5,162,720 | 11/1992 | Lambert | 320/6 |
| 5,200,688 | 4/1993 | Patino et al. | 320/13 |

FOREIGN PATENT DOCUMENTS

299427 12/1990 Japan .

*Primary Examiner*—Thomas M. Dougherty
*Assistant Examiner*—Aditya Krishnan
*Attorney, Agent, or Firm*—Sughrue, Mion, Zinn, Macpeak and Seas

[57] ABSTRACT

A power supply voltage change-over apparatus for a vehicle has a parallel/series connection change-over relay 4 which connects two batteries 1a, 1b in parallel when an ordinary load is used or the batteries are charged, and which connects the batteries in series when a large power electric load is actuated opening and closing state of each contact 5a, 5b or 5c of the relay 4 is detected by a terminal voltage Ea or Eb of a switch 7 for actuating the large power electric load, and the detected voltage is inputted to a controller 8. The controller distinguishes the failure of a normally open contact 5a, 5b or 5c, and prohibits further operations of the apparatus, whereby short-circuiting of the batteries can be prevented.

3 Claims, 4 Drawing Sheets

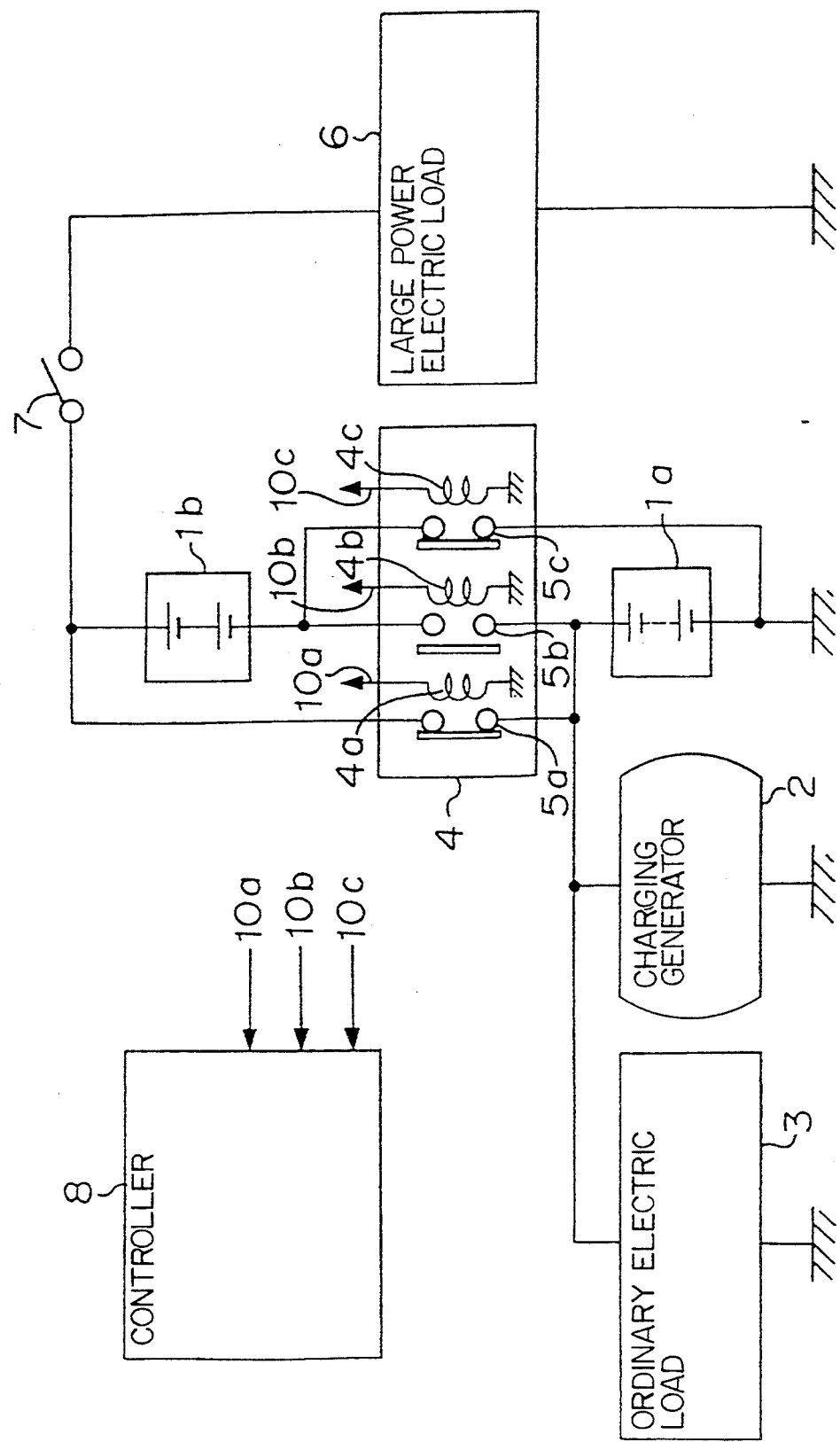

POWER SUPPLY VOLTAGE CHANGE-OVER APPARATUS FOR A VEHICLE

BACKGROUND OF THE INVENTION

1. Field of the Invention

The present invention relates to a power supply apparatus for changing-over a plurality of batteries from a parallel connection to a series connection and vice versa. More particularly, the present invention relates to a power supply voltage change-over apparatus for a vehicle which connects two batteries in parallel when an ordinary load is used or the two batteries are charged, and which connects the two batteries in series when a large power electric load is actuated.

2. Discussion of Background

A conventional power supply voltage change-over apparatus is described with reference to FIG. 4 in a block diagram. In FIG. 4, reference numerals 1a and 1b designate batteries mounted on a vehicle, numeral 2 designates charging generator for charging the batteries, numeral 3 designates an ordinary electric load, numeral 4 designates a parallel/series connection change-over relay for changing-over the batteries 1a, 1b in a parallel connection or a series connection. The relay 4 contains driving coils 4a, 4b and 4c and contact points 5a, 5b and 5c. Numeral 6 designates a large power electric load (or a large current load) such as an electrically heated catalyst, numeral 7 designates a switch for connecting the batteries to actuate the large power electric load 6, and numeral 8 designates a controller which is connected with control lines 10a, 10b and 10c extending from the relay 4 and controls the driving coils 4a to 4c and the switch 7 at the optimum timing.

FIG. 4 shows a state of normal operation. In such normal operation, the positive side of the battery 1a is connected to the positive side of the battery 1b by means of a contact 5a of the relay 4. Similarly, the negative sides of the batteries 1a and 1b are connected by a contact 5c. Thus, the batteries 1a, 1b are connected in parallel, and they are charged by the charging generator 2 while they supply power to the electric load 3. In FIG. 4, the contacts 5a to 5c of the relay 4 are normal off contacts, namely, they are normally opened when no electric current is supplied to the coils 4a to 4c. The Figure shows that the coils 4a and 4c receive an electric current from the controller 8.

Description will be made as to a case that the large power electric load 6 is to be actuated.

During the above-mentioned normal operation, when the controller 8 judges that a condition for actuating the large power electric load 6 is established, the controller 8 opens the contacts 5a, 5c by stopping a driving current to the coils 4a and 4c of the relay 4, and at the same time, the controller 8 closes the contact 5b by feeding a current to the coil 4b. By the operation of the controller 8, the positive side of the battery 1a and the negative side of the battery 1b are connected each other to thereby form a series connection. At the same time, the switch 7 is closed by means of the controller 8. Then, power is supplied to the large power electric load 6 from the batteries 1a, 1b and the charging generator 2.

When operation of the large power electric load 6 is finished, the switch 7 is opened. The controller 8 stops the supply of current to the coil 4b of the relay 4, and at the same time, the coils 4a, 4b are supplied with a current to close the contacts 5a, 5c whereby the state of normal operation is restored.

The conventional power supply voltage change-over apparatus for a vehicle has, however, the following disadvantage. If a failure of normal opening occurs in either contact of the parallel/series connection change-over relay 4 by an accident such as melting, the controller can not detect the failure. In this case, when the operation of the system is continued, a contact for connecting the positive side and the negative side of the batteries may be closed whereby there is a danger of short-circuiting the batteries.

SUMMARY OF THE INVENTION

The present invention eliminates the above-mentioned problem of the conventional apparatus and provides a power supply voltage change-over apparatus for a vehicle which prevents the short-circuiting of a power supply voltage change-over system including a relay for connecting batteries in parallel or in series and which can improve reliability.

The foregoing and other objects of the present invention have been attained by providing a power supply voltage change-over apparatus for a vehicle comprising two batteries; a parallel/series connection change-over relay which connects the two batteries in parallel when an ordinary load is used or the batteries are charged, and which connects the two batteries in series when a large power electric load is to be actuated. A switch connects the two batteries to the large power electric load, a contact failure detection means detects a fault of normal opening of a contact in the relay by using a terminal voltage of the switch means, and a control means prohibits operations of the system when the contact failure detection means detects a normally closing state of a contact in the relay.

A detection means is provided in the power supply voltage change-over apparatus to detect deterioration in the large power electric load and the entire system by using a terminal voltage or a current which is caused by closing the switch.

Further, a diode may be used in place of a contact for connecting the positive sides of the batteries at the time of the operation of a parallel connection, the contact being one of three contacts in the parallel/series connection change-over relay.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein:

FIG. 4 is a block diagram showing a conventional power supply voltage change-over apparatus.

DETAILED DESCRIPTION OF PREFERRED EMBODIMENTS

Figure 1:
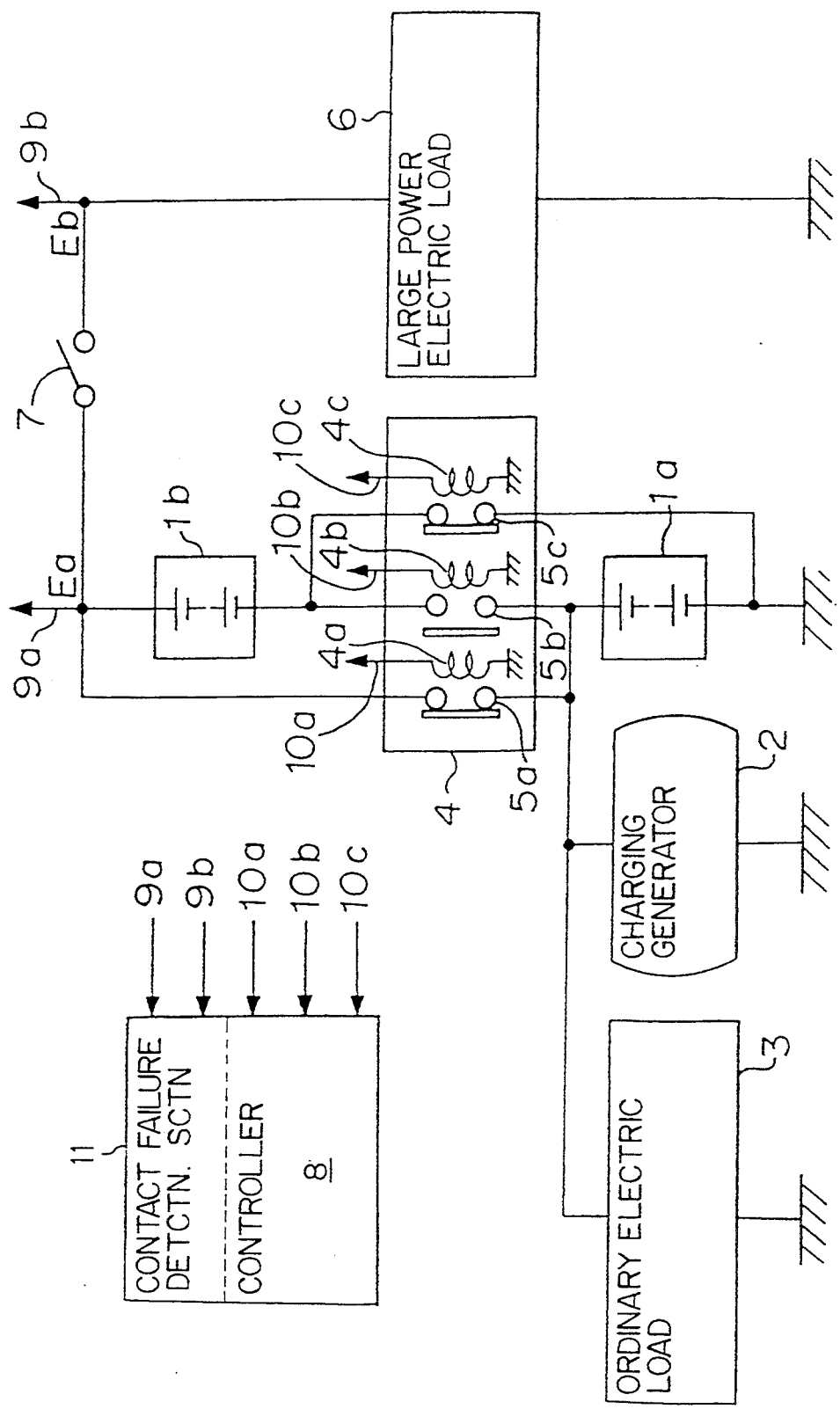
FIG. 1 is a block diagram of an embodiment of the power supply voltage change-over apparatus for a vehicle according to the present invention.

Referring to the drawings, preferred embodiments of the present invention will be described in more detail.

FIG. 1 is a block diagram showing an embodiment of the power supply voltage change-over apparatus according to the present invention wherein the same reference numerals as in FIG. 4 designate the same or corresponding elements, and accordingly description of these elements is omitted.

In the same manner as the conventional apparatus, the apparatus of the present invention comprises the charging generator 2, the parallel/series change-over relay 4, the switch 7 for actuating a large power electric load and the controller 8, wherein the two batteries 1a, 1b are connected in parallel when an ordinary electric load 3 is used or they are charged, and the two batteries are connected in series when the large power electric load 6 is to be actuated.

In addition to the above, the embodiment of the present invention is so constructed that a terminal voltage Ea appearing at a battery terminal side with respect to the switch 7 and a terminal voltage Eb appearing at the large power electric load terminal side are inputted to a contact failure detection section 11 embodied in the controller 8 through signal lines 9a and 9b.

The detection section 11 of the controller 8 functions to detect and discriminate a failure of normal opening of any of the contacts 5a to 5c of the parallel/series connection change-over relay 4 by utilizing the terminal voltages Ea, Eb. The relay 4 and the switch 7 are subjected to a change-over control at the optimum timing based on a result of discrimination. Further, the controller 8 can prohibit further operations of the system when a failure of normal opening of the contacts is detected.

Figure 3:
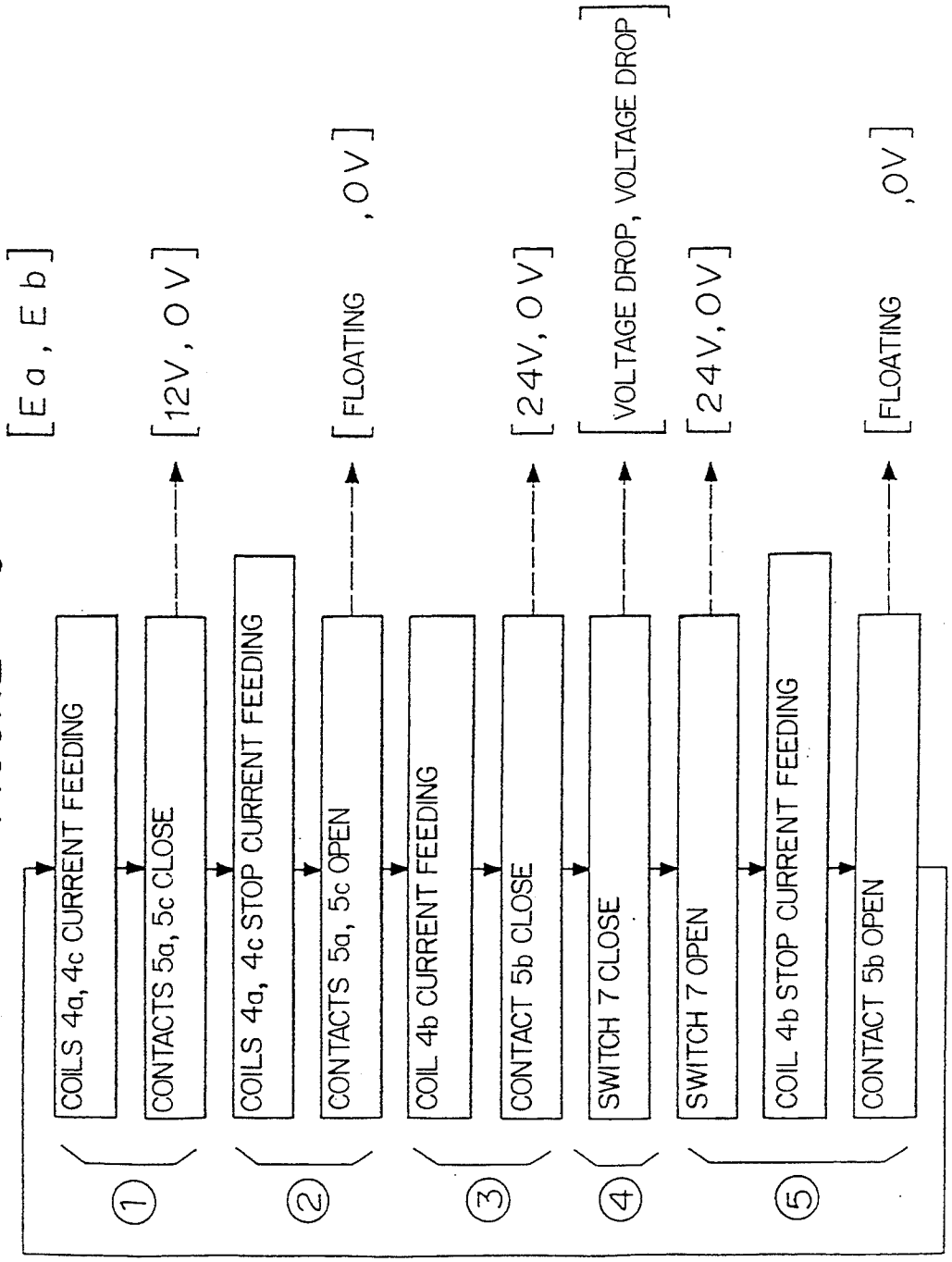
FIG. 3 is a flowchart for explaining the operation of the apparatus shown in FIGS. 1 and 2.

The operation of the first embodiment of the present invention will be described with reference to a flowchart in FIG. 3. Supposing that the apparatus is in a state of normal operation as shown in FIG. 1, and in the same manner as the conventional apparatus described before, the controller 8 supplies a current to the coils 4a, 4c of the relay to close the contacts 5a, 5c whereby the positive sides of the batteries 1a, 1b are connected and the negative sides of the batteries are connected respectively. Then, the electric load 3 is supplied with power from the batteries 1a, 1b connected in parallel while the batteries 1a, 1b receive power from the charging generator 2. In this state, since the switch 7 for actuating the large power electric load 6 is open, terminal voltages Ea and Eb appearing at the terminals at both sides of the switch 7 are 12 V and 0 V, for instance. These voltages are inputted to the controller 8 (see Operation ① in FIG. 3). For convenience in description, numerical values are shown for the terminal voltages Ea, Eb corresponding to states of operation in FIG. 3.

When a condition for actuating the large power electric load 6 is established, the controller 8 stops feeding a current to the coils 4a, 4c of the relay 4 so that the contacts 5a, 5c are opened (Operation ②). Then, the controller 8 feeds a current to the coil 4b to close the contact 5b so that the batteries 1a, 1b are connected in series.

At this moment, since the switch 7 is opened, the terminal voltage Ea indicates 24 V and the terminal voltage Eb indicates 0 V, which are inputted to the controller 8 (Operation ③). Then, the switch 7 is closed by the controller 8 whereby power is supplied to the large power electric load 6. The terminal voltage Ea of the switch 7 assumes a voltage corresponding to the load 6 and a voltage drop in the switch 7, and the terminal voltage Eb assumes a voltage given by the resistance of the load 6. These terminal voltages Ea, Eb are inputted to the controller 8 (Operation ④).

When the operation of the large power electric load 6 is finished, the switch 7 is opened by the controller 8, and the controller 8 stops feeding a current to the coil 4b of the relay 4 to thereby open the contact 5b (Operation ⑤). On the other hand, the controller 8 feeds a current to the coils 4a, 4c to thereby close the contacts 5a, 5c, whereby a state of normal operation is restored (Operation ①).

The above-mentioned description concerns control of the system in a case when each of the contacts of the relay 4 operates normally.

A description now will be made for a case when a failure of normal opening occurs in one of the contacts.

In the transition from Operation ① to Operation ③, the terminal voltage Ea appearing at one side terminal of the switch 7 changes from 12 V (which is in the normal state) through a floating voltage to 24 V. In this case, if a failure of normal opening occurs in either the contact 5a or the contact 5c, the terminal voltage Ea does not assume a floating voltage but stay at 12 V even though current fed to the coils 4a, 4c is stopped by the controller 8, and then, the failure detection section 11 of the controller recognizes the failure of normal opening in the contact 5a or the contact 5c. As a result, the control to proceed to Operation ③ is stopped, namely, the controller 8 does not feed a current to the coil 4b. If Operation ③ proceeds without stopping and a current is fed to the coil 4b to close the contact 5b, short-circuiting occurs between the positive side and the negative side of the battery 1b in a case when the contact 5a is faulty, and short-circuiting occurs between the positive side and the negative side of the battery 1a in a case when the contact 5c is faulty, both cases inviting an accident.

When operations are returned from Operation ⑤ to Operation ①, the terminal voltage Ea changes from 24 V through a floating voltage to 12V. In this case, if a failure of normal opening occurs in the contact 5b, the terminal voltage Ea does not assume the floating voltage but stays at 24 V even though current fed to the coil 4b is stopped by the controller 8.

By the above-mentioned state of voltage, the failure detection section of the controller 8 recognizes that a failure of normal opening has occurred in the contact 5b, and the stops control for Operation ①. If the control is not stopped, short-circuiting results in the batteries 1a and 1b. By repeating the above-mentioned operations, the controller 8 can detect a failure of normal opening in each of the contacts of the relay 4 by the terminal voltage Ea of the switch 7, and stops control to the system so as to prevent an accident due to the short-circuiting of the batteries.

A second embodiment of the present invention will be described.

In the first embodiment, a failure of normal opening of the contacts 5a, 5b and 5c of the relay is detected by the terminal voltage Ea of the switch 7, and control of the system is stopped whereby short-circuiting of the batteries 1a, 1b can be prevented. In the second embodiment, a deterioration of the large power electric load 6 can be detected by the terminal voltage Eb of the switch 7 in Operation ④ in the flowchart of FIG. 3.

Namely, since the terminal voltage Eb in Operation ④ assumes a value which relies on the resistance of the load 6, the resistance increases or decreases depending on a degree of deterioration. Accordingly, by setting a voltage value of Eb previously in the controller 8, it is possible to take a safety measure such as stopping control to the system or operating an alarm lamp when the terminal voltage Eb exceeds the set value.

Further, when the resistance of the large power electric load 6 has a constant value, the terminal voltage Eb of the switch 7 is in proportion to a current value flowing in the system, and accordingly, the current can be measured by using the terminal voltage Eb. The current value becomes small when the resistance of a portion of the circuit of the apparatus is increased, or a shortage of charging or deterioration of the batteries occurs. On the other hand, it becomes large when short-circuiting occurs in the load 6. Accordingly, the controller 8 can always detect a normal state Or an abnormal state of the apparatus.

A third embodiment of the present invention will be described.

Figure 2:
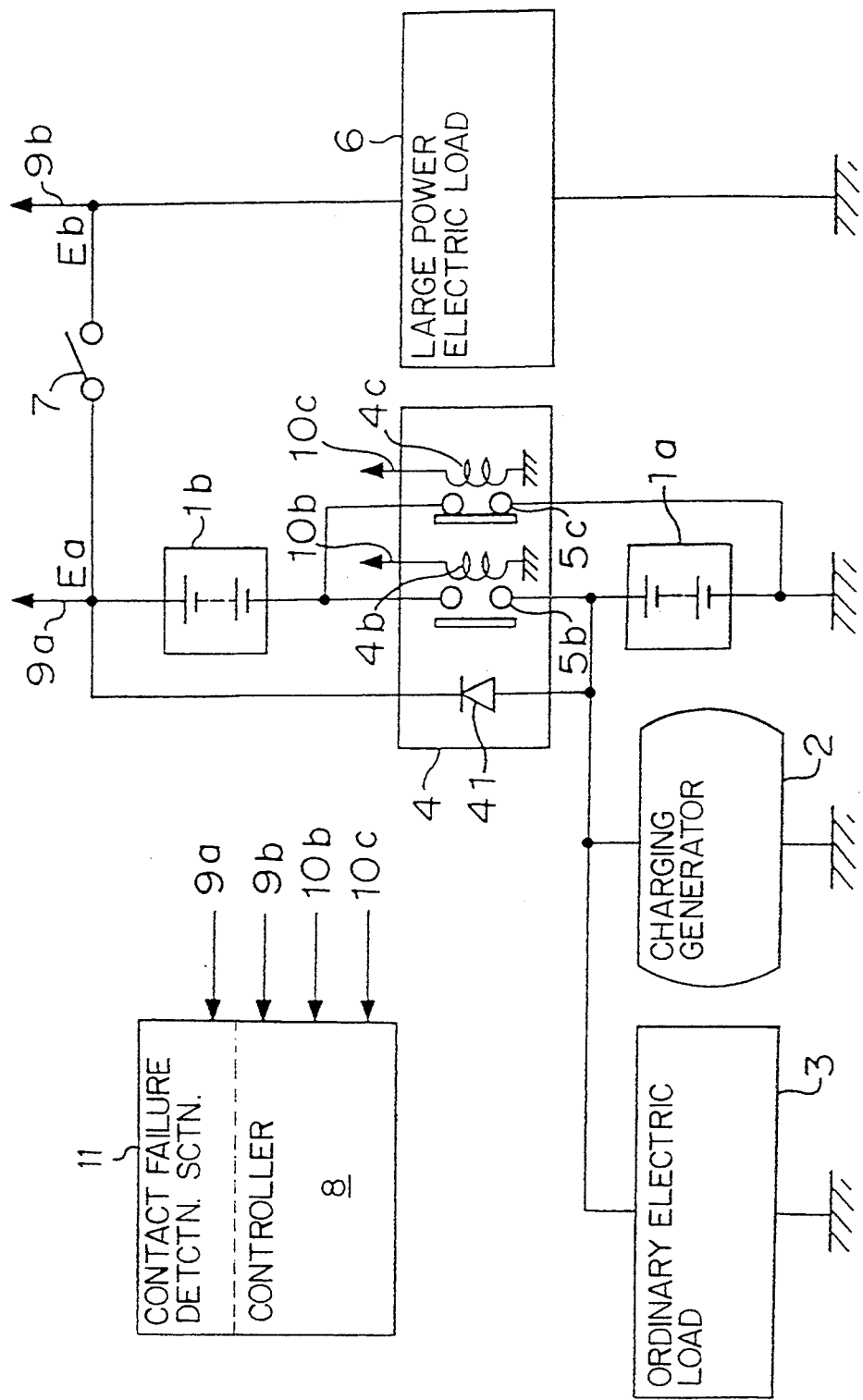
FIG. 2 is a block diagram of another embodiment of the power supply voltage change-over apparatus for a vehicle according to the present invention.

FIG. 2 is a block diagram showing another embodiment of the present invention. The structure of the third embodiment is the same as that shown in FIG. 1 except that a diode 41 is used in place of the coil 4a and the contact 5a of the parallel/series connection change-over relay 4. Thus, by substituting the diode 41 for the coil 4a and the contact 5a of the relay, the number of mechanically movable elements of the apparatus can be reduced. Accordingly, a possibility of failure in the normally open state of the contact due to melt-bonding can be reduced. Further, a load to the controller 8 can be reduced to thereby improve reliability.

Thus, in accordance with the present invention, a highly reliable power supply voltage change-over apparatus can be obtained wherein an accident which may be caused by the short-circuiting of batteries can be prevented and the apparatus can be protected from destruction.

In accordance with another embodiment, deterioration and failure in a large power electric load and the system itself can be detected by utilizing a terminal voltage or a current which is generated upon the closing of a large power electric load actuating switch, which can further improve reliability.

In accordance with another invention, the number of mechanically movable elements can be reduced to thereby decrease a possibility of the failure of normally closing in the relay by substituting a diode for a contact which connects the positive side of each battery in a parallel/series connection change-over relay when the apparatus is operated in a state of parallel connection.

Obviously, numerous modifications and variations of the present invention are possible in light of the above teachings. It is therefore to be understood that within the scope of the appended claims, the invention may be practiced otherwise than as specifically described herein.

What is claimed is:

1. A power supply voltage change-over apparatus for a vehicle, comprising:
   a) two batteries;
   b) a parallel/series connection change-over means including a plurality of normally open relay controlled switch contacts for connecting the two batteries in parallel when a first, normal current load is used or when the batteries are being charged, and for connecting the two batteries in series when a second, larger, relatively high current load is to be actuated;
   c) a switch means for selectively connecting the two batteries to the second load; and
   d) means for preventing a short-circuiting of a battery during a parallel/series change-over operation, said preventing means comprising:
   e) a contact failure detection means for detecting a failure of a relay switch contact to open by monitoring a terminal voltage of the switch means; and
   f) a controller for preventing a change-over operation when the contact failure detection means detects a failure of a relay switch contact to open.

2. The power supply voltage change-over apparatus according to claim 1, further comprising means for detecting a fault in the second load by monitoring a terminal voltage or a current when the switch means is closed.

3. The power supply voltage change-over apparatus according to claim 1, wherein the parallel/series connection change-over relay has a diode in place of one of said relay controlled switch contacts for connecting together positive sides of the two batteries.

* * * * *